(No Model.)
T. F. WILLIAMS.
FISHING MACHINE.
No. 301,653. Patented July 8, 1884.
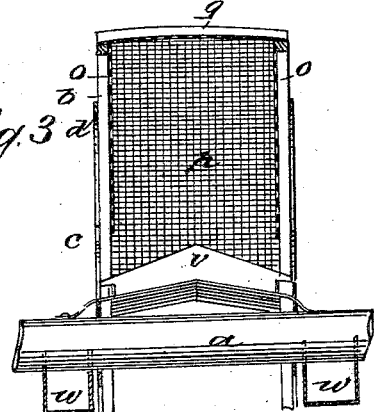
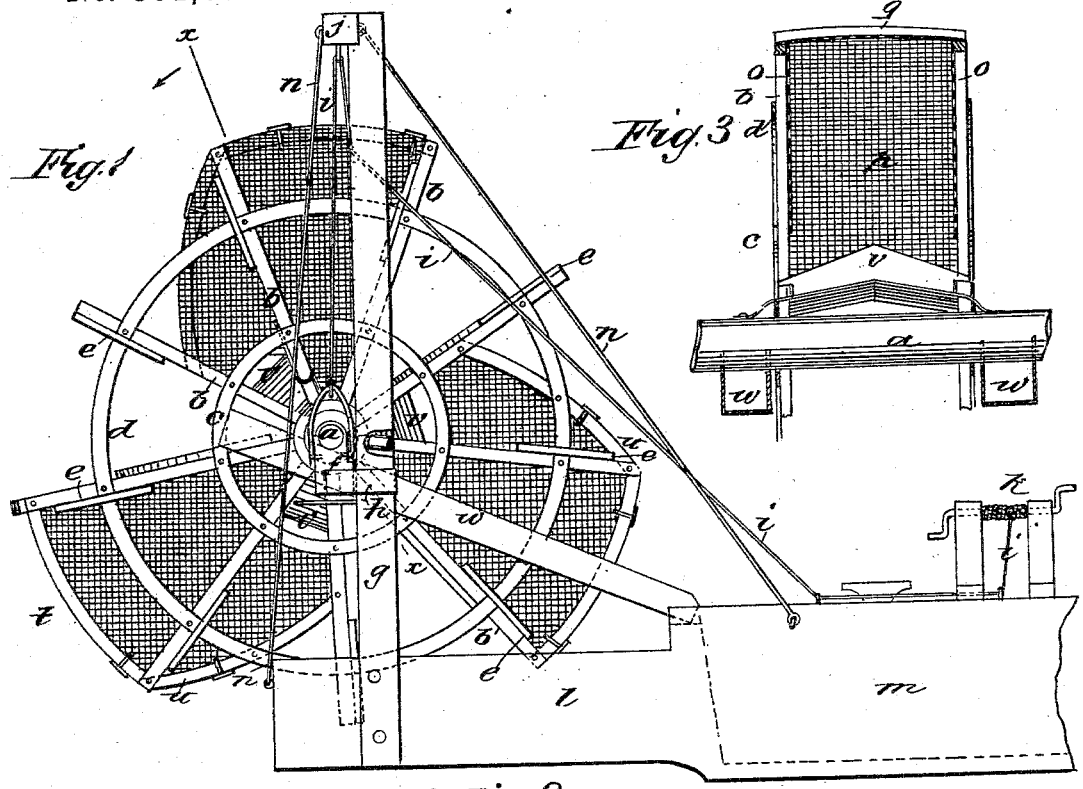
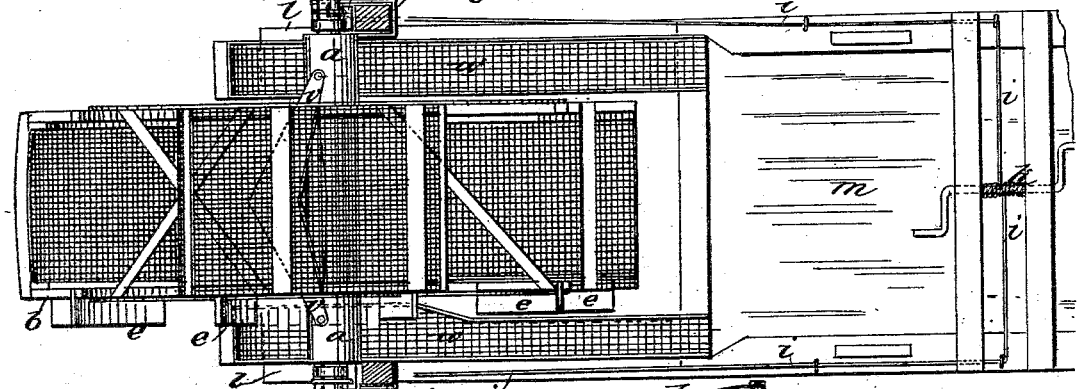
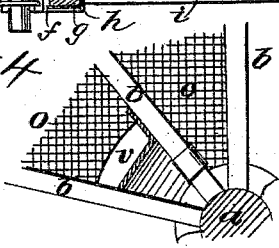
WITNESSES:
INVENTOR:
T. F. Williams
BY Munn & Co
ATTORNEYS.

UNITED STATES PATENT OFFICE.

THORNTON F. WILLIAMS, OF CASCADE LOCKS, OREGON, ASSIGNOR OF ONE-HALF TO GEORGE W. WILLIAMS, OF SAME PLACE.

FISHING-MACHINE.

SPECIFICATION forming part of Letters Patent No. 301,653, dated July 8, 1884.

Application filed November 8, 1883. (No model.)

*To all whom it may concern:*

Be it known that I, THORNTON F. WILLIAMS, of Cascade Locks, in the county of Wasco and State of Oregon, have invented a new and Improved Fishing-Machine, of which the following is a full, clear, and exact description.

My invention consists of a wheel of revolving dip-nets mounted on a scow for being located in different positions, the supports of the wheel being arranged on an extension of the stern of the scow, and the nets being provided with double-inclined chutes, for discharging the fish out of each end of the wheel into other chutes extending forward and discharging into the hold of the scow, which may contain water for the fish, and the wheel-arms being contrived with buckets for rotating the nets, all as hereinafter fully described.

Reference is to be had to the accompanying drawings, forming part of this specification, in which similar letters of reference indicate corresponding parts in all the figures.

Figure 1 is a side elevation of my improved fishing-machine. Fig. 2 is a plan view. Fig. 3 is a detail in section on the line $x\ x$, Fig. 1. Figs. 4 and 5 are details in transverse section of the shaft.

The wheel consists of axle $a$, arms $b$, rims $c$ and $d$, and floats $e$, attached to the arms for turning the wheel by the current of the water, said floats being arranged on the outside of the arms and parallel to them, instead of extending across from one arm to another, which would turn the fish away from the nets. The shaft is mounted in suitable boxes, $f$, which may be arranged to slide on a single post, $g$, by any suitable clip, $h$, connecting it thereto. The boxes, being suspended by cords $i$, form an overhead beam, $j$; or two posts may be used for each box, to form guides between which the boxes may be fitted; or a sash-frame connected over the top of the wheel, and having the boxes in it, may be arranged between the posts. The cords will pass over suitable pulleys at the top of the posts, and thence to a windlass, $k$, on the scow, to be wound on or off for raising and lowering the wheel.

Instead of erecting the posts on a permanent foundation, or by driving piles in the ground, I attach them to stern timbers or keelsons $l$, extending from the scow $m$, in order that the wheel may be easily shifted about from place to place as the current changes, or for other reasons, staying said posts by suitable tension-rods, $n$, connected to them at the top and to the scow, as required for the purpose, thus largely increasing the usefulness of the machine.

The nets consist of two sides, $o$, back $p$, and a rim-section, $q$, of wire-gauze, attached to the wheel-arms, rim, bars $t$, and back stays, $u$, in such arrangement that the rim-section $q$ and back $p$ receive the fish entering between the sides $o$ and gather them in as the nets rise out of the water toward the center of the wheel, where I have arranged double-inclined chutes $v$, onto which the fish are delivered from the back $p$ of the nets as said nets revolve, and which discharge from the center of the wheel each way out of both ends, alongside of which I have arranged the long chutes $w$, parallel to the ends of the wheel, to conduct the fish directly into the hold of the scow. These chutes will have perforated or slat bottoms, to allow the water discharging into them from the nets to escape, so so as not to flow into and fill the scow.

The wheel may have a crank to be turned by a connecting-rod from the scow; or power may be applied in any approved way for turning it.

It is obvious that the double-inclined chutes $v$, discharging freely at each end of the wheel, permit the use of a much broader wheel than is possible with a single chute discharging at one end only, thus largely increasing the capacity of the wheel and insuring a larger catch of fish in less time, and a largely-increased catch when the fish run together in large numbers at any particular time.

By attaching the floats $e$ directly to the wheel-arms I make the wheel lighter and avoid a central frame-work of an independent paddle-wheel or float-frame at the sides of the fish-wheel, which would interfere with the free discharge of the fish therefrom.

The details of construction may vary. For instance, the posts $g$ may rise from the sides of the scow $m$ instead of from the overhanging timbers $l$, and the wheel shaft or axle $a$ be journaled at the outer ends of timbers, having their inner ends hinged to the stern of the scow, and also having cords passing from their outer ends over pulleys or parts $g$ to tie-blocks on the scow. I may also have a timber frame extending from the scow around the fish-wheel, to serve as a fender or guard to the wheel.

Having thus described my invention, what I claim as new, and desire to secure by Letters Patent, is—

1. A fishing-machine consisting of revolving dip-nets having chutes discharging at the ends of the revolving net-wheel, supporting-posts for said wheel, a scow having extension-timbers from one end for the support of the posts, and chutes at the ends of the wheel to receive the fish from the nets and discharge them into the scow, combined and arranged, and the net-wheel being provided with means by which it is turned, substantially as described.

2. The combination of the revolving shaft $a$, carrying a series of dip-nets having openings in their sides, with the series of double-inclined chutes $v$, mounted on the shaft, and the inclined portions thereof resting upon the lower back portions, $p$, of the nets, with their ends in line with the openings in the sides of said nets, substantially as set forth.

THORNTON F. WILLIAMS.

Witnesses:
   HENRY L. GOODWIN,
   C. SEDGWICK.